United States Patent [19]

Buerner

[11] 4,242,804
[45] Jan. 6, 1981

[54] UNIVERSAL DIGITAL CONVERTER FOR DRAFTING MACHINES

[75] Inventor: Wolfgang P. Buerner, Flintridge, Calif.

[73] Assignee: Los Angeles Scientific Instrument Co. Inc., Los Angeles, Calif.

[21] Appl. No.: 61,526

[22] Filed: Jul. 27, 1979

[51] Int. Cl.³ .................... G01B 3/12; B43L 13/02
[52] U.S. Cl. ............................. 33/438; 33/141 R; 33/1 M
[58] Field of Search .......... 33/1 M, 125 C, 125 M, 33/121–124, 141 R, 141.5, 141 E, 438, 430, 439–492, 443–449

[56] References Cited

U.S. PATENT DOCUMENTS 2,421,581 6/1947 Scott ........................... 33/141 R
4,171,575 10/1979 Blessing et al. ............... 33/134 R Primary Examiner—Harry N. Haroian
Attorney, Agent, or Firm—Sellers and Brace

[57] ABSTRACT

A universal digital converter for drafting machines operable to sense and instantly display numerically on one of the machine scales incremental linear or angular movements thereof. A sensor mounted on the scale has a wheel in rolling contact with the drafting surface and generates signals proportional to the net distance moved in a selected direction and these signals are processed electronically to represent the distance travelled in any desired preselected scale ratio. The sensor is quickly positionable to measure movements of either the horizontal or vertical scales, as well as angular movements of the protractor ring of a standard drafting machine.

19 Claims, 7 Drawing Figures

UNIVERSAL DIGITAL CONVERTER FOR DRAFTING MACHINES

This invention relates to drafting machines, and more particularly to a unique universal digital converter attached to a drafting machine scale for sensing incremental movements of the machine in either linear or angular directions and instantly displaying the net movement digitally in a window mounted on the scale.

BACKGROUND OF THE INVENTION

Various proposals have been made heretofore for specifically constructed drafting machines equipped with means for performing various drafting operations including precision measuring and plotting operations. Typical of these proposals are set forth in U.S. Pat. Nos. Rabe 2,112,113; Pascoe et al 3,166,844; Fausel 3,758,949; and Whetstone 3,956,588. Rabe poses modifying a drafting machine in a manner adapted for it to perform planimeter functions. The device has a main scale and a vernier scale both of which must be read, their readings combined, and then multiplied by a constant. This is a laborious and time consuming operation at best, and one or both scales can be misread and mistakes can occur in summing and multiplying them with a constant. Each of the other three proposals also involve a specially constructed drafting machine equipped with electrical connections between one of more sensors and remotely located readout device. No one of these devices has a motion sensor and signal generator in rolling contact with the drafting surface, nor a single sensor which is quickly and accurately positionable to measure linear movements selectively or angularly in X and Y directions, at the user's option.

SUMMARY OF THE INVENTION

The shortcomings, disadvantages, limitations and complexities of prior proposals for providing drafting machines with measuring facilities are avoided by the present invention. The invention device comprises an incremental encoder mounted on a drafting machine scale and pivotally supporting a high resolution signal generator or movement sensing device having a roller in light rolling contact with the drafting surface. The axis of the signal generator is positionable selectively normal to the edge of the scale or parallel thereto and, additionally, in a third position with its axis lying in the same plane as the axis of the drafting machine protractor ring. The signals generated by the roller and representing movements, such as 1000ths of an inch, are processed electronically and instantly converted if desired into any of a wide multitude of scale ratios and displayed in digital readout means mounted directly on the drafting machine scale. A reset button mounted on the scale permits the user to reset the readout to zero at will. The movement sensing unit and the readout are so small and compact that they do not interfere with the use of the drafting machine and its scales. If desired, the electronic processor scale ratio components and their manual controls may be housed separately and mounted along one margin of the drafting board and connected to the scale-mounted components by flexible cabling extending along the arms of the drafting machine linkage.

It will therefore be recognised that the invention digital converter measures the net movement of a drafting machine scale in any direction as well as arcuate movements of its protractor ring in any selected scale ratio, the results being displayed visually in digital form directly on one of the machine scales.

Accordingly it is a primary object of this invention to provide a unique universal digital converter readily attachable to a drafting machine and providing an instantaneous high precision digital readout of net linear or angular movements of the machine scales.

Another object of the invention is the provision of a compact signal generator and readout mounted directly on a drafting machine scale and providing instantaneous readings of movement of the scale in any desired scale ratio.

Another object of the invention is the provision of a drafting machine scale having a signal generating roller attached thereto and positionable selectively normal to, parallel to, or in alignment with the axis of the drafting machine protractor ring.

Another object of the invention is the provision of a drafting machine scale having rigidly secured between the opposite ends thereof a movement sensing signal generator quickly pivotable between three stable positions on the scale and operatively connected to a scale ratio converter means and to digital readout means carried by the scale for displaying movements of the scale arm in any one of several different selected directions.

These and other more specific objects will appear upon reading the following specification and claims and upon considering in connection therewith the attached drawing to which they relate.

Referring now to the drawing in which a preferred embodiment of the invention is illustrated:

Figure 1:
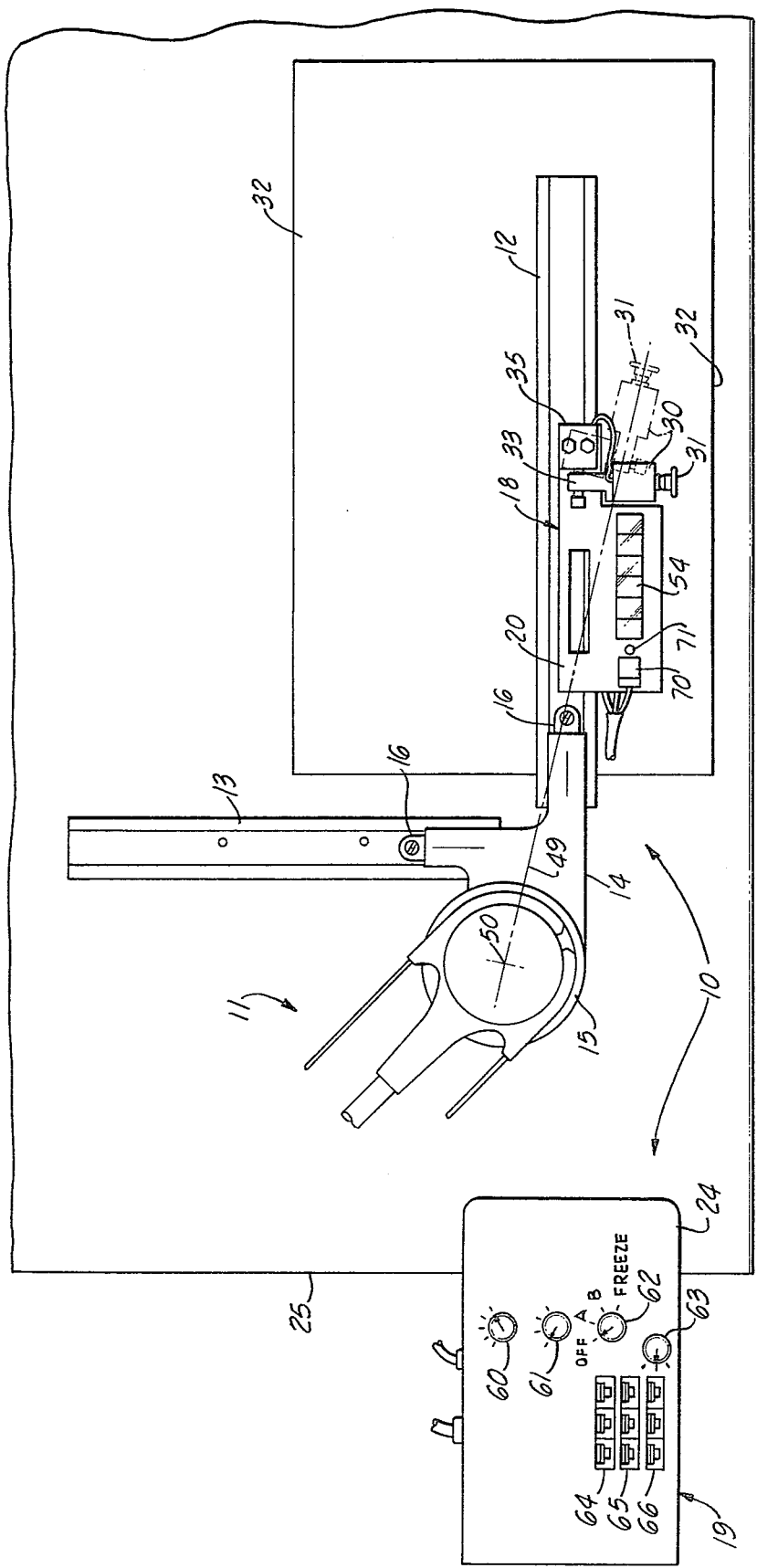
FIG. 1 is a fragmentary plan view of the scale-supporting end of a conventional drafting machine on the horizontal scale of which is mounted an illustrative embodiment of the invention universal digital converter.
Figure 2:
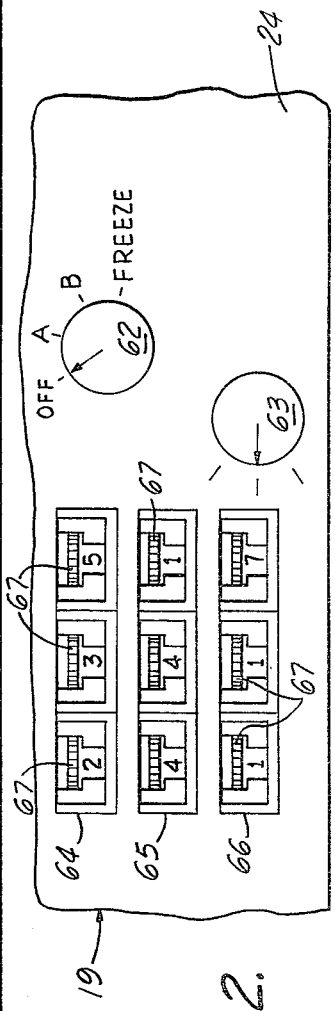
FIG. 2 is a fragmentary view on an enlarged scale of the scale ratio selector dials.
Figure 3:
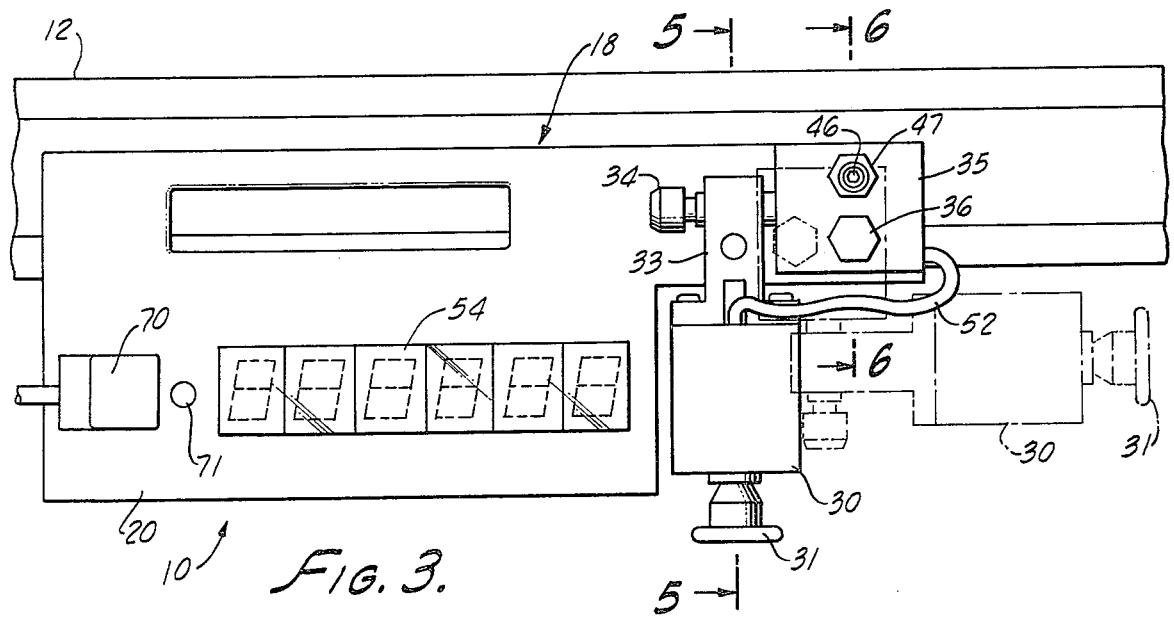
FIG. 3 is a fragmentary plan view on an enlarged scale of the signal generator and readout components, the full line showing of the signal generator having its roller axis normal to the scale and including a dot and dash line showing of the generator with its roller axis lying parallel to the scale.
Figure 4:
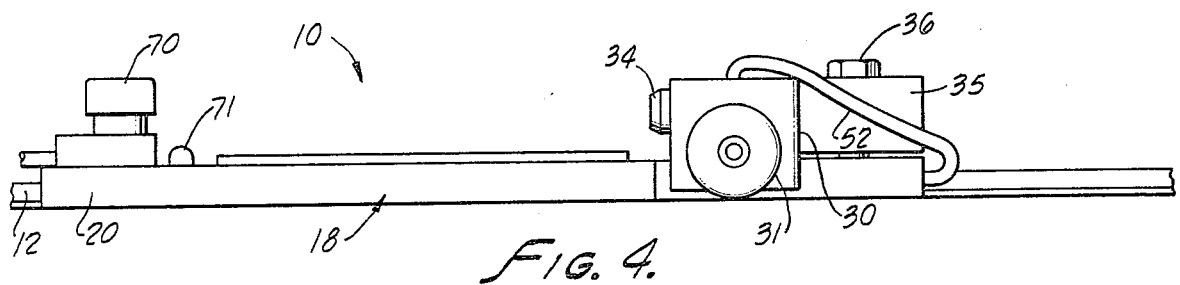
FIG. 4 is an elevational view of FIG. 3 taken from the lower longitudinal side thereof.
Figure 5:
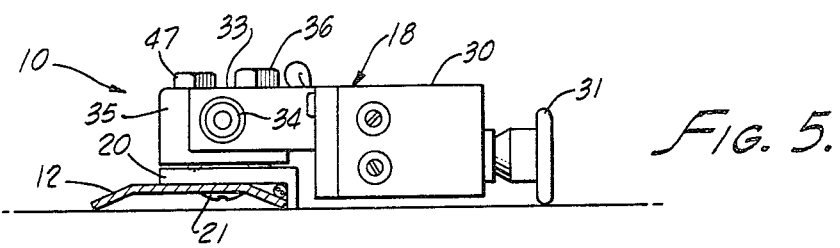
FIG. 5 is a cross sectional view taken along line 5, 5 on FIG. 3.

Referring first more particularly to FIG. 1, there is shown an illustrative embodiment of the invention universal digital converter, designated generally 10, mounted on a conventional drafting machine 11. Since the drafting machine may be of any well known type, only the horizontal and vertical scales 12 and 13 have been shown together with the fitting 14 forming part of the protractor ring 15. Scales 12 and 13 are each fitted with a well known coupling 16, 16 having a snug telescopic fit in the horizontal and vertical ends of fitting 14.

Digital converter 10, as here shown, includes two self-contained units 18 and 19. Unit 18 has a main body 20 securely clamped to scale 12, as by screws 21 (FIGS.

5 and 6). Unit 19 houses the electronic components for processing the signals generated by unit 18 and may be provided with spring clip mounting means 24 designed to straddle the edge of the drafting board 25 and support unit 19 securely in any selected position along the edge of the drafting board. Electronic processor components suitable for use in practising this invention are obtainable commercially from Los Angeles Scientific Co. Inc., Los Angeles, California. The components of this unit will be described following a description of unit 18 mounted on the drafting machine scale.

Referring to FIGS. 3 to 7, the details of converter unit 18 will be described. The high precision increment measuring unit 30 is provided with a roller 31 projecting from one end having rolling contact with the drafting board or with a sheet of material 32 mounted thereon. Generator 30 includes a mounting bracket 33 pivotally supported on a shouldered screw 34 extending horizontally into one side of a mounting block 35. Block 35 is pivotable about the shank of a vertical cap screw 36 supported in main body 20. The axes of screws 34 and 36 lie at right angles to one another and have a high tolerance pivotal fit with bracket 33 and block 35 respectively.

Figure 6:
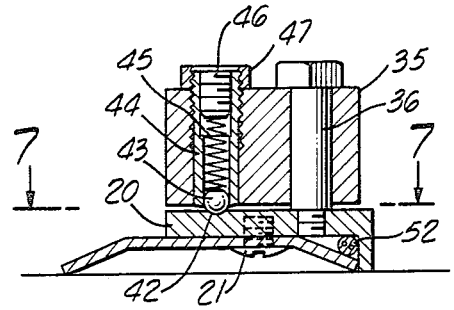
FIG. 6 is a cross sectional view taken along line 6—6 on FIG. 3.
Figure 7:
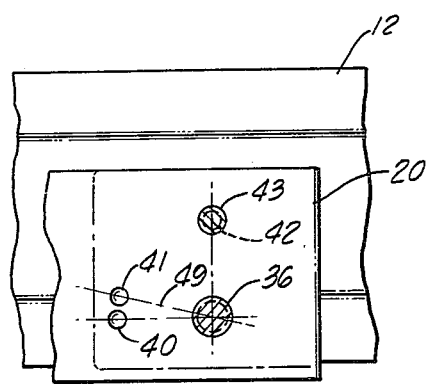
FIG. 7 is a cross sectional view taken along line 7—7 on FIG. 6.

Block 35 and signal generator 30 are bodily pivotable about the axis of cap screw 36 to any one of three different positions in which they are accurately but releasably latched, as by the ball and detent mechanism shown in FIG. 6. For this purpose, the upper surface of the main body 20 is provided with three semi-spherical detents 40, 41 and 42 (FIG. 7) cooperating with a ball 43 held captive in but projecting from the lower end of a sleeve threaded into a vertical bore of block 35 (FIG. 6.) Ball 43 is biased downwardly by a compression spring 45 and an adjustable set screw 46 bearing against its upper end. Sleeve 44 may be locked in a desired adjusted position by a lock nut 47. The centers of detents 40 and 42 are spaced 90° from one another with respect to the vertical axis of cap screw 36, whereas the center of detent 41 is intersected by a plane represented by the dot and dash line 49 which plane lies normal to the drafting surface and in which the axes 50 of the protractor and of pivot pin 36 lie.

Generator 30 and its high precision roller 31 are suitably spring biased into light but firm contact with the drafting table or sheet material 32. The generator may be of any suitable type capable of generating a multiplicity of electrical pulses or signals representing very small discreet rotary movement of the roller 31. Typically the generator is designed to generate one thousand signals for each complete rotation of the roller but, in a suitable size, it has a circumference such that 425 signals are produced per inch of linear travel.

A suitable construction serving this purpose is disclosed in U.S. Pat. No. to Colbourn 3,912,926, granted Oct. 14, 1975. The Generator signals are conducted by flexible cabling 52 to the electronic unit 19 where they may be processed if desired to any of many different scale ratios before the net accumulated value is digitally displayed in the digital display window 54 supported in main body 20 of unit 18.

As herein shown, the electronic processing unit 19 is provided with four control knobs 60, 61, 62 and 63 and with three rows of scale programming switches 64, 65 and 66, there being three such switches in each row each having a ring of digits around its rim from 0 to 9. The rim of each of the control knobs 67 is knurled for ease of adjustment to display a single one of the digits in the associated window.

Assuming the user wished to set switches in row 64 to provide a 1:1 ratio, he would divide 1 by 425 and obtain a result of 0235 whereupon he would set each of the switches in row 64 to display 235. Using the same procedure, the switches in row 65 have been set for a scale of 1"=40', or to read 441, and the switches in row 66 have been set for a scale of 1 to 5, i.e. to read 117.

Knob 60 may be set in one of five different positions to position the decimal point at a selected position between the digits displayed in the readout window of unit 18.

Knob 61 can be set in any one of four positions to accommodate the signal input generator of any one of four different drafting accessories, one of which is illustrated in this application as attached to the horizontal arm of the drafting machine. The signal generating cable of other transducers none of which are illustrated, but such as a planimeter, a contour tracing accessory, or an XY plotting accessory may be plugged into processing unit 19. Examples of such accessories are shown in my co-pending application for U.S. Letters Patent Ser. No. 893,985 filed Apr. 6, 1978. The electronic unit 19 has one or more input sockets, not shown, on its side connectable to the signal generator of any of these auxiliary transducers and any one of which can be used with processor 19 and the readout display window 54 of unit 18, it merely being necessary to set selector knob 61 in the appropriate position to process the signals of a particular transducer.

Control knob 62 has four positions including an "off" position and three "on" positions marked A, B and Freeze. When the knob is turned to position A, the power to all components is turned on and readout device displays, in window 54, the net movement of roller 31 of signal generator 30 in one direction, such as upwardly without activating the pilot light 71. Net movements in the opposite direction are also displayed but pilot 71 remains excited to warn the user that the movement displayed is in the negative direction. Pilot light 71 functions in the reverse manner if knob 62 is shifted to the B position. If knob 62 is turned to the fourth or freeze position, then the results of a preceding movement is locked or frozen into the readout while the drafting machine is being moved to a different starting position, thereupon the knob is transferred back to the former one of the A or B positions whereupon the instrument is moved until the readout displays a reading which is the sum of the first movement plus a desired additional movement in the same direction.

Knob 63 is rotatable to any one of three positions to connect a particular one of the three rows of the scale program switches 64, 65 and 66 in circuit with the signal generator and the electronic processor to indicate in the readout window when the drafting device has been moved a specified distance in any selected scale ratio.

OPERATION

The operation of the invention digital converter will be readily apparent from the foregoing description of the components and their operative relationship to one another. The combined sensing unit and readout device 18 is here shown as rigidly mounted on scale 12 but it will be understood that these components can be mounted on the vertical scale 13 if desired. To place the unit in operation the user turns knob 62 of unit 19 to either the A or B position and positions the two scales of the drafting machine in a desired position on sheet 32. If two vertical lines are to be drawn a specified distance apart the signal generator 30 is positioned as shown in full lines in FIG. 1 and scale 13 is placed over the first position. Knob 62 is then turned to position A to energize all components and to measure a particular distance to the right from the starting point. When the machine is properly positioned for drawing the first line the reset button 70 on unit 18 is depressed to restore any digits appearing in the readout window 54 to zero. The first line is then drawn whereupon the drafting instrument is shifted to the right until the specified distance is displayed in window 54 whereupon a second line is drawn. It is pointed out that it is immaterial whether the instrument moves irregularly and in a random path between the first and second positions since the signal generator measures only the net movement in the positive direction and displays only this result in the readout window. If the instrument is to be used to lay out a distance in the opposite or negative direction then the operator follows the same procedure as described above but pilot light 70 adjacent the readout window will be activated to warn the operator that the readout readings represent net movement in the opposite or negative direction. If the operator wishes pilot light 70 to indicate layout movements in the positive direction he turns knob 62 to the B position.

If the operator wishes to shift to a different scale, he merely adjusts the scale program switches in one of the rows 64, 65 or 66 to the desired scale ratio and then turns knob 63 to the appropriate position to place that row of program switches in circuit with the signal generator 30 and the processing unit 19.

When performing drafting operations using the horizontal scale 12 to measure distances between parallel movements of this scale he simply manually rotates the signal generator 30 so that the shaft of its roller 31 lies parallel to the edge of scale 12 with ball 43 firmly seated in detent 40.

If on the other hand the operator wishes to perform a protractor operation, this merely necessitates rotating the signal generator to the dot and dash line position shown in FIG. 1, so that the axis of roller 31 intersects the axis of the protractor ring 15. Drafting operations are then performed in the usual manner as scale 12 is rotated from one position to another about the axis 50 of protractor ring 15.

While the particular universal digital converter for drafting machines herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in a drafting machine of the type having a unitary horizontal and vertical scale assembly bodily pivotable as a unit about the axis of the protractor scale ring of said machine, which improvement comprises:

an incremental encoder secured to and pivotable with said unitary scale assembly, said encoder having a sensing wheel adapted to have continuous rolling contact with underlying sheet material and freely rotatable in either direction to sense the net movement of said sensing wheel over said sheet material thereby to generate electrical signals proportional to the rotary movement of said wheel over said sheet material; and means, including digital electronic readout means securable to said drafting machine adjacent said encoder, providing an instantaneous precision readout of the net movement of said sensing wheel in either direction from a previous position thereof.

2. That improvement as defined in claim 1 characterized in that said encoder is pivotable between first and second stable stationary positions at right angles to a respective one of the vertical and horizontal scales of a drafting machine.

3. That improvement as defined in claim 1 characterized in that said encoder includes means pivotally supporting the same for movement about an axis normal to a scale of said drafting machine, and means holding said encoder selectively stationary in one of a plurality of different positions.

4. That improvement as defined in claim 3 characterized in that in one of said stationary positions the axis of said encoder wheel lies in a plane normal to the edge of one of the scales of said drafting machine.

5. That improvement as defined in claim 3 characterized in that in one of said stationary positions the axis of said encoder wheel lies in a plane parallel to the edge of the scale of a drafting machine to which said encoder is secured.

6. That improvement as defined in claim 3 characterized in that in one of said stationary positions of said encoder the axis of said encoder's wheel lies in a plane passing through the upright axis about which said scale is pivotable.

7. That improvement in a conventional drafting machine of the type having separate horizontal and vertical scales bodily pivotable as a unit about the axis of protractor scale ring means at the outer end of parallelogram linkage means and the other end of which linkage means is pivotally securable to a drafting table, said improvement comprising:

digital converter means mounted on a portion of said machine operatively associated with said protractor ring means and equipped with a signal generating wheel adapted to be in rolling contact with sheet material on said drafting table and having the axis of said wheel lying in a plane parallel to a selected one of said scales and including means for holding said converter means selectively in another position with the axis of said signal generating wheel lying in a plane normal to said sheet material and at a predetermined angle to the edge of said one scale; and electronic means, including readout means connected to said signal generating wheel operable in response to movement of said scales from one position to another to indicate at said readout means the net movement thereof.

8. That improvement in a drafting machine as defined in claim 7 characterized in that said net movement of said one scale is parallel to itself.

9. That improvement in a drafting machine as defined in claim 7 characterized in that said net movement of said scale is about the pivot axis of said protractor scale ring means.

10. That improvement in a drafting machine as defined in claim 7 characterized in the provision of reset button means for resetting said readout to zero at the user's option.

11. That improvement in a drafting machine defined in claim 7 characterized in that said electronic means include manually operated scaling means for converting the distance measured by said signal generating wheel to any desired scale.

12. That improvement as defined in claim 1 characterized in that said electronic readout means includes a plurality of scale converters each readily adjustable to convert the distance measured by said sensing wheel to any selected scale, and manual means for quickly selectively connecting said readout means in circuit with any one of said scale converters.

13. That improvement in a drafting machine scale of the type having a snug telescopic fit with a drafting machine protractor ring which improvement comprises:

signal generator means movably supported on said scale having a signal generating wheel positioned for rolling contact with sheet material adapted to underlie said scale when in use on a drafting machine;

means for holding said generator means selectively in one of a plurality of operating positions, including first and second positions at right angles to one another, with the axis of said wheel in an upright plane either parallel to or normal to one longitudinal edge of said scale; and readout means mounted on said scale electrically connected to said signal generating wheel in a direction transversely of its axis.

14. That improvement defined in claim 13 characterized in the provision of reset means on said scale for resetting the said readout means to zero at the user's option.

15. That improvement defined in claim 13 characterized in the provision of manually operable means selectively positionable to convert the signals from said signal generator wheel to represent increments to any of a multitude of scale ratios.

16. That improvement defined in claim 15 characterized in the provision of a plurality of said manually operable means each setable to a preselected different scale ratio and means for quickly substituting any selected one of said scale ratio converters in circuit with said generator wheel and said readout means.

17. That improvement defined in claim 13 characterized in the provision of detent means for holding said signal generator means releasably but firmly and precisely in a selected one of said plurality of operating positions.

18. That improvement defined in claim 17 characterized in that in one of said plurality of operating positions the axis of said signal generator wheel lies in the same plane as the axis of the drafting machine protractor ring when said drafting machine scale is firmly assembled thereto and whereby said readout means is adapted to display digits representing the precise net angular movement of said scale about the axis of the protractor ring.

19. That improvement defined in claim 18 characterized in the provision of reset means on said scale for resetting said readout means to zero at the user's option.

* * * * *

UNITED STATES PATENT AND TRADEMARK OFFICE
CERTIFICATE OF CORRECTION

PATENT NO. : 4,242,804
DATED : January 6, 1981
INVENTOR(S) : Wolfgang P. Buerner It is certified that error appears in the above-identified patent and that said Letters Patent are hereby corrected as shown below:

Claim 5, Column 6, line 28, before "secured" insert

-- adapted to be --.

Signed and Sealed this

Twenty-eighth Day of April 1981

[SEAL]

*Attest:*

RENE D. TEGTMEYER

*Attesting Officer*     *Acting Commissioner of Patents and Trademarks*